United States Patent [19]
Thrower

[11] Patent Number: 4,903,887
[45] Date of Patent: Feb. 27, 1990

[54] INERTIA WELD IMPROVEMENTS THROUGH THE USE OF STAGGERED WALL GEOMETRY

[75] Inventor: Jack S. Thrower, West Palm Beach, Fla.

[73] Assignee: United Technologies Corporation, Hartford, Conn.

[21] Appl. No.: 287,219

[22] Filed: Dec. 21, 1988

[51] Int. Cl.$^4$ .............................................. B23K 20/12
[52] U.S. Cl. ..................................... 228/112; 228/113
[58] Field of Search ................... 228/112, 113, 114, 2, 228/263.12

[56] References Cited

FOREIGN PATENT DOCUMENTS 154388 9/1982 Japan .................................... 228/112
1306672 4/1987 U.S.S.R. ............................... 228/12

OTHER PUBLICATIONS

Metals Handbook Ninth Edition, vol. 6, pp. 719–728, ©1983.

Primary Examiner—Richard K. Seidel
Assistant Examiner—Samuel M. Heinrich
Attorney, Agent, or Firm—Charles E. Sohl

[57] ABSTRACT

Geometries are described for joining superalloy articles by inertia welding. First and second hollow superalloy articles are joined wherein the first article has an inside and an outside diameter which are less than the inside and outside diameter of the second article. This produces a staggered joint geometry which results in curved "S" shaped weld zone and beneficial control of the residual weld notch.

2 Claims, 3 Drawing Sheets

PIOR ART

13 X

INERTIA WELD IMPROVEMENTS THROUGH THE USE OF STAGGERED WALL GEOMETRY

TECHNICAL FIELD

This invention relates to the inertia welding of hollow articles. This invention also relates to the inertia welding of high strength superalloy articles and to the inertia welding of high strength superalloy articles produced by powder metallurgy.

BACKGROUND ART

Inertia welding is a process used to join metallic articles which are generally symmetrical about an axis of rotation. Such articles may be solid or hollow. Thus for example inertia welding can be used to join components together to form an article such as a crankshaft or a welded hollow tube assembly. The inertia welding process is described for example in U.S. Pat. Nos. 3,234,644; 3,235,162; 3,462,826; 3,591,068; and 4,365,136 which are incorporated herein by reference.

Briefly, in inertia welding the articles to be joined are located and positioned so that their axes of symmetry coincide and the surfaces to be joined are in a parallel relationship. One of the articles is held stationary, the other is attached to a rotatable flywheel. The rotatable article—flywheel combination is accelerated to a predetermined rotational speed and the rotating article is then forced against the stationary article. The flywheel geometry, mass and rotational speed determine the available kinetic energy, and this kinetic energy is dissipated (converted into thermal energy) by friction between the articles to be joined. The articles are forced together and the dissipated kinetic energy is sufficient to cause localized softening. When the flywheel rotation stops, the force between the articles is maintained or increased causing the softened portions of the articles to bond together. The force between the articles causes plastic or superplastic deformation in the weld zone. Cooling of the weld zone is fairly rapid by conduction of heat into the articles.

The inertia welding process is conducted under conditions which cause expulsion of a significant amount of material from the weld zone thus inherently removing detrimental surface contamination. The weld zone is more characteristic of a forging rather than a casting. Weld zones produced by other forms of welding such as laser, electron beam and electric fusion welding have weld zones which have been melted and resolidified and, therefore, have the characteristics of a casting which are generally less desirable than the characteristics of a forging which are approximated by inertia weld zones.

Inertia welding is a form of friction welding. Another form of friction welding relies on a continuous motor drive to provide frictional heating rather than flywheel stored energy. As used herein the term inertia welding includes other forms of rotational friction welding.

Inertia welding was developed and has been widely used in joining ferrous materials such as iron and steel in the heavy construction equipment industry. Recently it has been employed with reasonable success in joining superalloys. The joining of superalloy materials is much more demanding than the joining of ferrous materials since superalloys have higher softening temperature and are much more resistant to high temperature deformation. Inertia welding of "powder processed" superalloys are the most difficult of all inertia welding applications. The zone in the articles to be joined, which is to be softened by the welding process, is limited and the degree of upset or deformation in the weld zone is similarly limited. Consequently, in the inertia welding of superalloys (and particularly powder processed superalloys) there is generally a residual notch observed at the weld zone. Such a notch is not often observed in inertia welding of ferrous materials.

Unfortunately, in the case of powder processed nickel superalloys the weld zone notch invariably extends inwardly beyond the original diameters of the welded components. Thus, even after the weld upset is removed by machining there a notch usually remains and removal of the notch requires machining to less than the original diameters of the articles which were joined. If the notch is not fully removed, it acts as a stress riser and as a failure initiation site during subsequent use of the welded article or even during the subsequent heat treatment. This notch problem is particularly detrimental in higher strength superalloys i.e. those having yield strengths in excess of 100 ksi at 1000° F.) and in superalloy materials produced by the powder metallurgy techniques.

In the initial fabrication of superalloy articles by inertia welding the notch problem can be overcome, at some economic cost, by making the initial parts oversized and machining the welded assembly down to a size sufficient to eliminate the notch. Unfortunately this is not generally practical when it is desired to repair a damaged article by inertia welding. This is because the undamaged portion of the article has already been machined to a particular diameter, usually a minimum design diameter which cannot be reduced without adversely weakening the part. Thus, when attempts have been made to remove a damaged portion of a superalloy article and replace it with a new portion, the inertia weld has been the weak point in the finished article because of the weld zone notch which either acts as itself to weaken the article or requires that the article be machined undersized.

Even in the original fabrication situation the use of oversized articles may exceed the capacity of available inertia welding machines.

There are also weld geometries which have heretofore been difficult to inertia weld. One of these problem geometries is encountered in producing tapered articles such as hollow cones. This problem is encountered in joining a shaft to a disk in a gas turbine engine.

Accordingly it is an object of the invention to describe a method for inertia welding materials and controlling the depth and location of the weld zone notch.

It is another object of the invention to disclose a method of inertia welding high strength (and/or powder metallurgy processed) superalloys while minimizing the deleterious effects of the weld zone notch.

Finally it is an object of the invention to disclose a geometry for inertia welding articles together to form a conical hub.

DISCLOSURE OF INVENTION

Superalloys are nickel base alloys strengthened by precipitates based on $Ni_3Al$. High strength superalloys are those whose yield strength at 1000° F. exceeds 100 ksi.

According to the present invention the inertia weld zone notch has its size and location controlled by causing the articles to be joined to have significantly different wall diameters. By varying the wall diameters of the hollow articles to be joined, steps can be produced at the weld zone which will effect the flow of heat produced by the welding process and therefore effect the weld zone geometry and the material expulsion from the weld zone and therefore the weld zone notch location and magnitude. Specifically, the invention weld geometry can reduce the extent of the notch and move its position so that it is substantially less deleterious than it would be in a conventional inertia weld.

The foregoing and other features and advantages of the present invention will become more apparent from the following description and accompanying drawings.

BEST MODE FOR CARRYING OUT THE INVENTION

The essential aspect of the invention is that weld joint geometry is changed to control heat flow and the material expulsion from the weld so that the expelled material does not form a notch within the ultimate dimensional envelope of the part to be fabricated in the welding process. The invention process is also adapted for fabrication of cone shaped or other tapered hollow articles.

Figure 3:
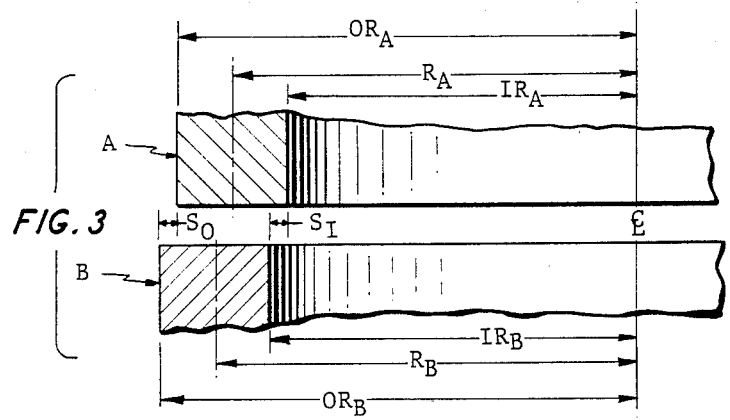
FIG. 3 is a geometry of a weld joint according to the present invention.

The invention may be understood through reference to FIG. 3 which shows how the article diameters are staggered with respect to each other thereby producing an offset between the articles to be joined and steps adjacent the weld zone on the inner and outer diameters of the weld. As will be discussed below this has significant implications in heat flow and the expulsion of soften material.

Figure 1:
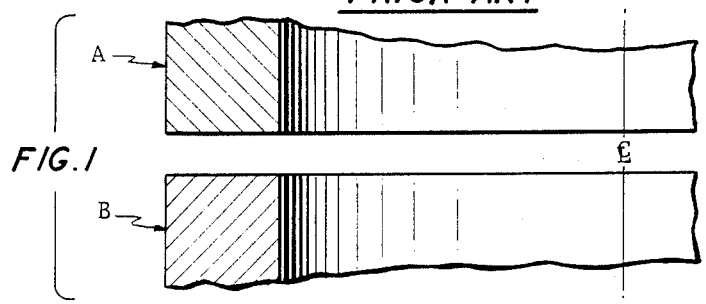
FIG. 1 is a schematic showing the weld geometry of a conventional hollow article.

FIG. 1 illustrates the conventional weld geometry for hollow articles. The articles to be joined are symmetrical about the center line shown and have identical thicknesses and the parts being joined are centered with respect to each other. Consequently, the weld zone is symmetrical across the plane of the weld zone and, assuming the article materials are the same, the expulsion of material from the weld zone will be symmetrical. The symmetry in FIG. 1 leads to the production of an essentially flat weld zone.

Figure 2:
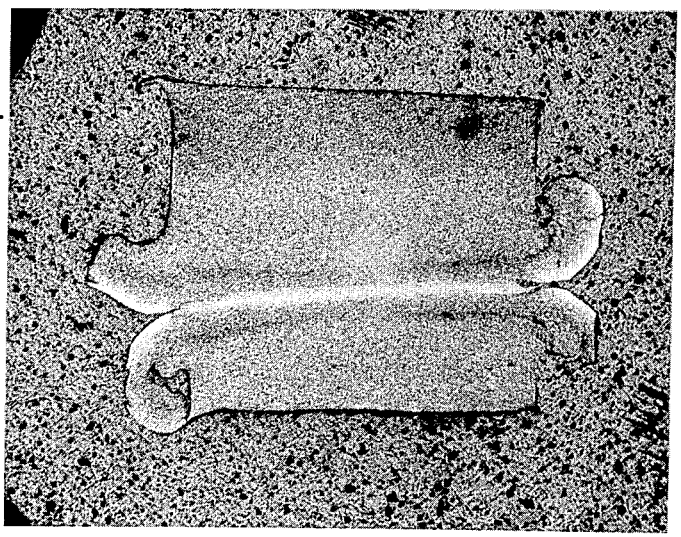
FIG. 2 is a photomicrograph of materials welded having a geometry shown in FIG. 1.
Figure 4:
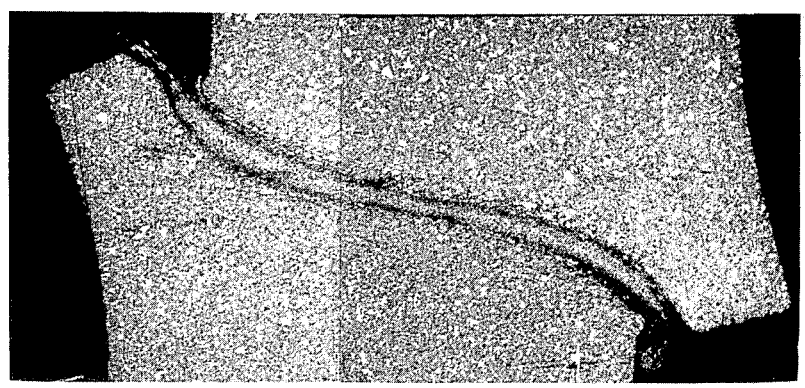
FIG. 4 is a photomicrograph of a weld joint made using the geometry of FIG. 3.

FIG. 2 is a macro photograph of a test joint made with the geometry shown in FIG. 1 illustrating the weld notch and the expelled material. Particular attention should be paid to the fact that the weld notch extends inward of the original article dimensions (both inside and outside diameters) meaning that the weld zone has less area than the projected area of the original articles. This joint or notch is highly deleterious to weld strength and durability. The weld zone in FIG. 2 is seen to be essentially flat, corresponding to the original interface between the articles.

FIG. 3 shows a weld geometry according to the present invention. As illustrated in FIG. 3 the radius of hollow article A is less than the radius of hollow article B. More specifically the outside radius $OR_a$ is less than the outside radius $OR_b$ and the inside radius $IR_a$ is less than the inside radius $IR_b$. Also, the mean radius of A is less than the mean radius of B where the mean radius is defined as $(OR+IR) 2$. These geometric differences produce steps at the interface between the two articles, a step $S_I$ at the inside diameter of the combined articles and a step $S_o$ the outside diameter of the combined articles. The inside step $S_I$ is on the opposite side of the bond plane from the outside step $S_o$. This step geometry causes changes in heat flow during the welding process and a change in stresses during heating and cooling of the weld zone.

A macro photograph of the resultant weld zone is shown in FIG. 3. It can be seen that this staggered weld geometry produces a weld zone with a distinct curvature having an S shape. The result of this curved weld zone geometry is that material expelled from the weld zone at the inside and outside diameters is projected at an angle to the article axis rather than perpendicular as would be the case in a conventional geometry inertia welding operation. This change of material expulsion effects the size and location of the residual weld zone notch. This means that the machining steps away both inward and outward of the weld zone can entirely remove the weld notch with minimal material removal. It appears that the step dimensions $S_I$ and $S_o$ should be from about 10 to about 50% of the thickness of A and preferably 15 to 40% of the thickness of A for superalloy materials. The thickness of A is $(OR_a-IR_a)$.

The wall thicknesses of A and B do not necessarily have to be equal so long as the inner and outer steps fall within the previously defined ranges. For example, if part A had a 0.200 inch wall thickness the steps could range from 0.020 to 0.100. A 0.200 wall thickness article having a 10 inch inside diameter $ID_A$, a 10.4 inch outside diameter $OD_A$ and a 10.2 mean diameter can be joined to another hollow component having a wall thickness of 0.32 an inside diameter of 9.96 an outside diameter $OD_B$ of 10.6, and a mean diameter of 10.28 to produce an outer step of 0.1 inch and an inner step of 0.02 and satisfy the invention criteria.

Figure 5:
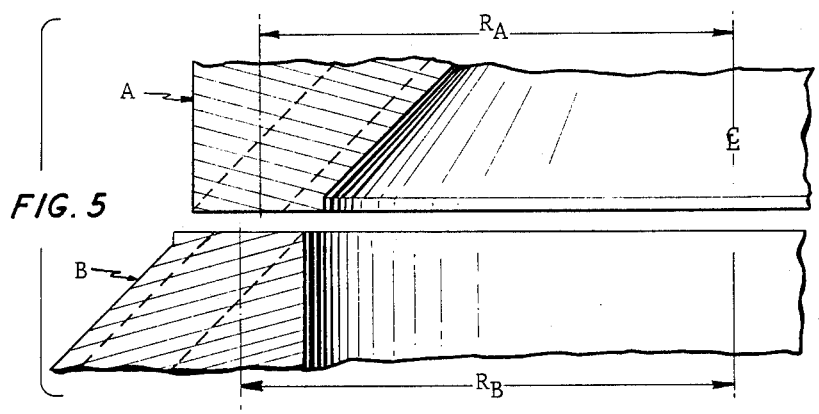
FIG. 5 is an alternate geometry for the invention weld zone.

FIG. 5 shows a somewhat different weld geometry for which the invention is particularly well suited, useful for the production of certain gas turbine engine components. In FIG. 5 the articles are staggered with respect to each other, and each has a taper in one of its walls, the inside wall of article A and the outside wall of article B, rather than having parallel walls. This geometry can be used to form a cone shaped article. Such a conical configuration is a common design feature in certain gas turbine engines wherein a shaft must be attached to a disk with a minimal mass and a high torque transfer capacity. The dotted lines show how a hollow cone shaped article can be machined from the inertia welded article with minimum material removal.

Figure 6:
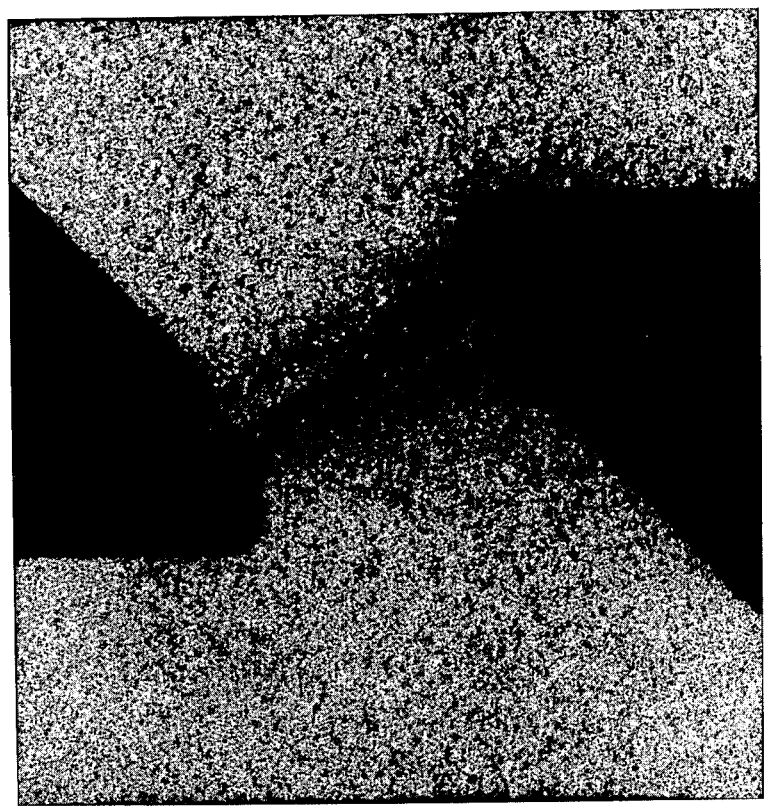
FIG. 6 is a photomicrograph of a weld zone produced by articles having the geometry of FIG. 5.

FIG. 6 is a photomicrograph of a test sample inertia welded having an original geometry shown in FIG. 5. It can be seen that again the weld notch has been moved and that a minimal metal removal is therefore required to produce a conical configuration.

Although this invention has been shown and described with respect to detailed embodiments thereof, it will be understood by those skilled in the art that various changes in form and detail thereof may be made without departing from the spirit and scope of the claimed invention.

I claim:

1. In the inertia welding of hollow high strength superalloy articles, the improvement which comprises:
   providing a first article to be joined, said first article having an inside diameter and an outside diameter and a centerline,
   providing a second article to be joined, said second article having an inside diameter and an outside diameter and a centerline,
   wherein the inside diameter of the first article is less than the inside diameter of the second article and the outside diameter of the first article is less than the outside diameter of the second article, so that when the first article and second articles are placed together, with their respective center lines coincident, radial steps are formed at the interface between the article, and so that upon welding an "S" shaped curved weld zone results.

2. Method of forming a cone shaped article by inertia welding superalloy articles including the steps of:
   providing a first article to be joined, said first article having an inside diameter and an outside diameter and a centerline,
   providing a second article to be joined, said second article having an inside diameter and an outside diameter and a centerline,
   wherein the inside diameter of the first article is less than the inside diameter of the second article and the outside diameter of the first article is less than the outside diameter of the second article, so that when the first article and second articles are placed together, with their respective center lines coincident, radial steps are formed at the interface between the article, and so that upon welding an "S" shaped curved weld zone results and then machining the welded article into a hollow cone shape configuration.

* * * * *